United States Patent [19]

Tanaka et al.

[11] Patent Number: 4,805,972
[45] Date of Patent: Feb. 21, 1989

[54] DYNAMIC PRESSURE GAS BEARING DEVICE

[75] Inventors: Katsuhiko Tanaka, Yamato-shi; Takanobu Sato, Odawara-shi; Ikunori Sakatani, Fujisawa-shi, all of Japan

[73] Assignee: Nippon Seiko Kabushiki Kaisha, Tokyo, Japan

[21] Appl. No.: 8,149

[22] Filed: Jan. 22, 1987

Related U.S. Application Data

[63] Continuation of Ser. No. 810,530, Dec. 17, 1985, abandoned, which is a continuation of Ser. No. 463,011, Feb. 1, 1983, abandoned.

[30] Foreign Application Priority Data

Feb. 5, 1982 [JP] Japan .................................. 57-16299
May 14, 1982 [JP] Japan .................................. 57-80213

[51] Int. Cl.⁴ ...................... G02B 26/10; F16C 17/10
[52] U.S. Cl. .................................. 350/6.7; 310/90; 384/99; 384/107; 384/113; 384/124; 384/372
[58] Field of Search ........................... 305/6.5–6.8; 310/90, 157; 384/99, 100, 107, 108, 112–115, 121, 123, 368, 372, 373, 416, 124

[56] References Cited

U.S. PATENT DOCUMENTS 3,718,379 2/1973 Williams et al. .................... 384/113

FOREIGN PATENT DOCUMENTS 2426271 1/1975 Fed. Rep. of Germany ...... 384/108
13049 2/1977 Japan ................................. 384/123
48105 5/1981 Japan ................................. 350/6.5

Primary Examiner—David Werner
Attorney, Agent, or Firm—Wyatt, Gerber Burke and Badie

[57] ABSTRACT

Disclosed is a dynamic pressure gas bearing device in a rotational unit in which a rotational member put on a cantilevered fixed shaft is designed such that an operating gas generated by a dynamic pressure groove formed between the fixed shaft and the rotational member is directed into a pressure chamber between the fixed shaft and the rotational member and supports the rotational member in the thrust direction and that the pressure in the pressure chamber is adjusted by a hole formed in the fixed shaft or the rotational member.

20 Claims, 2 Drawing Sheets

DYNAMIC PRESSURE GAS BEARING DEVICE

This application is a continuation application based upon Application Ser. No. 810,530, filed Dec. 17, 1985 and entitled "Dynamic Pressure Gas Bearing Device" now abandoned, which is a continuation of Application Ser. No. 463,011 filed Feb. 1, 1983, now abandoned.

BACKGROUND OF THE INVENTION

1. Field of the Invention

This invention relates to a dynamic pressure gas bearing device for use in the rotational unit of a business machine, an image instrument, an information instrument, an optical instrument or the like.

2. Description of the Prior Art

Heretofore, a structure in which the opposite ends of a shaft on which a polygon mirror is mounted are supported by ball bearings has often been used in a bearing device for the rotational unit of a rotational polygon mirror light deflector used in an instrument such as a laser beam printer. However, in a spindle device using the conventional ball bearings, it is not easy to attain the required accuracy of rotation, an irregularity of rotation results because of vibration based on the error in the machining of the race for the ball bearings, the vibration caused by the passage of the balls, and the vibration caused by the retainer or the irregularity of rotation caused by the grease enclosed in the ball bearings being irregularly bitten by the balls in rotation are unavoidable.

In such a rotational polygon mirror light deflector, where the accuracy of rotation of the polygon mirror in highspeed rotation is poor and where there is irregularity of rotation of the polygon mirror, the characters printed become blurred and, therefore, very severe accuracy of dynamic rotation is required of the supporting bearings. However, with the recent tendency of printers toward a higher speed and a smaller size, the number of revolutions of the rotational polygon mirror light deflector has increased from several thousand rpm to several tens of thousand rpm and the apparatus itself is in the tendency toward a smaller size. It has therefore become more and more difficult to improve the accuracy of rotation and eliminate the irregularity of rotation. Also, with the tendency toward a higher speed, the life of the ball bearings has become shorter and problems in reliability have arisen.

Further, to prevent the polygon mirror from being stained, it is desired that a lubricant such as grease which may scatter or evaporate not be used for the support bearings. However, the deterioration of the performance of the polygon mirror by scattering or evaporation of grease is unavoidable with the ball bearings because the ball bearings are greaselubricated. Even if magnetic fluid seal is used, scattering or evaporation of the oil itself used in the magnetic fluid is unavoidable and the use of such seal cannot be an essential countermeasure. Also, in the case of the ball bearings, prepressure adjustment has been necessary and therefore assembly has not always been easy, and it has been difficult from the viewpoint of mass production to assemble the ball bearings so that there is no mounting error to maintain dynamic rotational accuracy.

SUMMARY OF THE INVENTION

It is a first object of the present invention to provide a dynamic pressure gas bearing device which is improved in the dynamic rotational accuracy, the reliability during high-speed rotation and the durability.

It is a second object of the present invention to provide a dynamic pressure gas bearing device in which the starting torque of the rotational member is small and damaging of the various parts when the rotation is stopped is prevented.

It is a third object of the present invention to provide a dynamic pressure gas bearing device of which the environment is not contaminated but is kept clean during the use of the device.

It is a fourth object of the present invention to provide a dynamic pressure gas bearing device of which the entire structure is simplified and which is easy to assemble and excellent in mass productivity and which can be manufactured at low cost.

The invention will become fully apparent from the following detailed description thereof taken in conjunction with the accompanying drawings.

DESCRIPTION OF THE PREFERRED EMBODIMENTS

Figure 1:
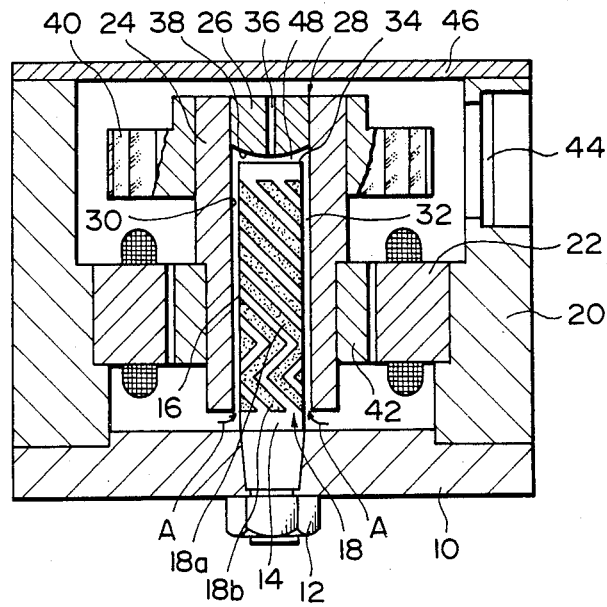
FIG. 1 is a front cross-sectional view showing a first embodiment of the present invention.

Referring to FIG. 1, fixed shaft 14 is installed upright on a plate-like base bed 10 by means of a nut 12 and a dynamic pressure generating groove 18 is formed in the outer peripheral, surface 16 of the fixed shaft 14. The groove 18 comprises a spiral groove 18a and herring bone grooves 18b. A cylindrical housing 20 is also secured to the base bed 10 and the stator 22 of a drive motor is secured to the inner peripheral surface of the intermediate portion of the housing 20 in the direction of the height of the fixed shaft 4. A rotor 42 which will hereinafter be described is opposed to the stator 22.

A rotational member 28 comprising a sleeve 24 and a thrust bearing member 26 pressure-fitted into one of the openings of the sleeve 24 is loosely fitted to the fixed shaft 14. The inner peripheral surface of the sleeve 24 is opposed to the outer peripheral surface 16 of the fixed shaft 14 with a predetermined gap 32 left therebetween, and the upper surface thereof provides a flat thrust end surface 34.

An axially extending hole 36 is formed centrally through the thrust bearing member 26 and the lower surface of the thrust bearing member 26 is formed into a thrust end surface 38 comprising a convex spherical surface. At least one of the thrust end surfaces 34 and 38 should desirably be formed into a convex spherical surface to decrease the starting torque and reduce the damage when the rotation is stopped, and accordingly the thrust end surface 34 may also be formed into a convex spherical surface. However, it is more effective to form the axial hole 36 in the thrust end surface 38 forming a convex spherical surface as in the present embodiment because the convex spherical surface can be prevented from eating into the axial hole. Also, one thrust end surface may be formed into a convex spherical surface and the other cooperating thrust end surface may be formed into a concave spherical surface having a radius slightly greater than that of the convex spherical surface.

In this embodiment, a material such as plastics of good slidability or ceramics of good wear is used for the thrust bearing member 26 to decrease the starting torque on the thrust end surface 38 during the starting of the rotational member 28 and moreover improve the wear when the rotation is stopped. In the present embodiment, the sleeve 24 and the thrust bearing member 26 are discrete members, but alternatively, they may be formed integrally with each other by the same member.

A polygon mirror 40 is secured to the sleeve 24 toward the upper portion thereof and a rotor 42 opposed to and cooperating with the stator 22 is secured to the sleeve 24 toward the lower portion thereof.

Also, toward the upper portion of the housing 20, namely, at the level corresponding to the polygon mirror 40, there is provided a glass window 44 for passing a laser beam therethrough, and the upper opening of a housing 20 is covered by a cover 46.

The operation of the present embodiment having the above-described construction will now be described. During the repose of the rotational member 28 (including the time of low speed rotation thereof), the thrust end surface 38 of the thrust bearing member 26 is in contact with the thrust end surface 34 of the fixed shaft 14.

As the rotational member 28 is driven by the drive motor and rotated clockwisely as viewed from above in FIG. 1, the ambient gas advances in the direction of arrow A due to the action of the dynamic pressure generating groove 18 and flows into the gap 32 between the outer peripheral surface 16 of the fixed shaft forming a radial bearing and inner peripheral surface 30 of the sleeve. Further, with the rotation of this rotational member 28, the air which has flowed into the radial bearing flows into a pressure chamber 48 formed between the thrust end surface 34 of the fixed shaft 14 and the thrust end surface 38 of the thrust bearing member 26 cooperating therewith. A thrust gas bearing film is formed by the air flowing into the pressure chamber 48 and thus, the thrust end surface 38 of the thrust bearing member 26 is supported by this bearing film. If the rotational member 28 floats up, the air in the pressure chamber 48 flows outwardly through the axial hole 36.

As described above, in the present dynamic pressure gas bearing device for rotational unit, the rotational member 28 in rotation is supported in non-contact in the radial direction by a radial gas (air) bearing portion comprising a dynamic pressure groove bearing formed by the outer peripheral surface 16 of the fixed shaft and the inner peripheral surface 30 of the sleeve cooperating therewith and in the axial direction (thrust direction) by a thrust gas (air) bearing portion formed by the gas film created by the action of the dynamic pressure groove 18 of the radial gas bearing portion. Accordingly, the sleeve in rotation is kept in non-contact by the dynamic pressure gas bearing film and therefore, any irregularity of rotation caused by the bearing can be avoided.

Also, by the groove bearing being used as the radial bearing, a pre-pressure effect by the dynamic pressure acts in the radial direction and even during high-speed rotation, the radial vibration of the sleeve can be minimized. On the other hand, the thrust bearing portion creates a thrust load capability by utilizing the gas flowing out of the radial bearing portion due to the dynamic pressure effect to squeeze the gas flowing out through the axial hole 36 which opens substantially centrally of the thrust end surface 38, and this leads to a very simple construction and reduced cost.

Further, since one of the pair of thrust end surfaces 34 and 38 is formed into a convex spherical surface, the great starting torque which is a drawback of the dynamic pressure gas bearing can be reduced remarkably and the wear caused by the contact between the thrust end surface 34 and 38 during non-rotation can be reduced. Moreover, even in case wear powder is created by the thrust end surface contacting each other when the rotation is stopped, the wear powder is discharged outwardly of the bearing via the axial hole 36, and this leads to the advantage that the wear powder is prevented from accelerating the wear of the end surfaces.

Further, since the radial bearing portion and the thrust bearing portion are formed integrally with each other by the rotational member 28 and this rotational member 28 is supported by the cantilevered fixed shaft 14, the entire structure becomes simple and is hardly affected by the assembly accuracy and thus, there can be by provided a bearing device which is advantageous in both cost and accuracy. Also, the rotor 42 and stator 22 forming the drive motor are liable to heat, but since there is formed a gas stream which flows in through the bearing gap of the radial bearing portion due to the action of the dynamic pressure and flows out through the axial hole 36 opening into the thrust bearing portion, there is the advantage that a gas stream for cooling the motor can be autmatically formed.

The dynamic pressure generating groove provided in the radial bearing portion is designed in accordance with the conditions of use and therefore, the present invention may be carried out by using any other groove pattern than that shown in the above-described embodiment.

Second to fourth embodiments of the present invention will now be described. For simplicity, in these embodiments, the parts similar to those of the first embodiment are given similar reference numerals and need not be described but description will be made chiefly of different parts.

Figure 2:
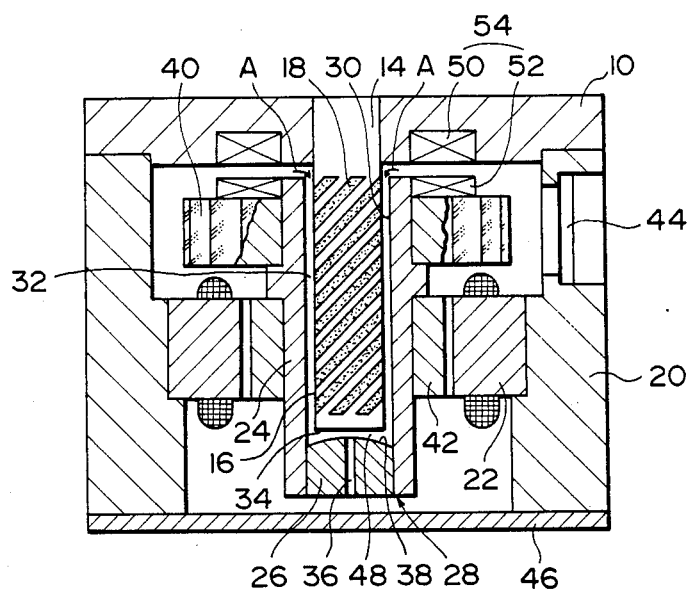
FIG. 2, 3 and 4 are front cross-sectional views showing second, third and fourth embodiments, respectively, of the present invention.

Referring to FIG. 2, a fixed shaft 14 has its upper end secured to a base plate 10 and is downwardly provided upright, and the fixed shaft 14 is clad with a rotational member 28 comprising a sleeve 24 and a thrust bearing member 26 pressure-fitted into the lower end thereof. The lower surface of the fixed shaft 14 is formed into a flat thrust end surface 34 while the upper surface of the thrust bearing member 26 is formed into a convex spherical thrust end surface 38. Opposed magnetic members 50 and 52 are fixed to the base plate 10 and the sleeve 24, and they constitute an auxiliary thrust magnetic bearing 54.

During non-rotation of the rotational member 28, the magnetic members 50 and 52 are attracted to each other and the rotational member 28 is not seated on but spaced apart from a cover 46, and the thrust end surfaces 34 and 38 are in contact with each other. When the rotational member 28 is rotated by a drive motor, the gas flowing in the direction of arrow A flows downwardly through a gap 32 between the outer peripheral surface 16 of the fixed shaft and the inner peripheral surface 30 of the sleeve and into a pressure chamber 48 and slightly forces the rotational member 28 downward by the pressure thereof. A thrust gas bearing film is then formed by the gas in the pressure chamber 48, and the trust end surface 38 is supported by this bearing film. According to the present embodiment, the rotational member 28 is upwardly biased by a force greater than weight thereof due to the action of the auxiliary thrust bearing 54 and moreover, the difference between the two is smaller than the weight of the rotational member 28. Accordingly, as compared with the embodiment shown in FIG. 1, the wear of the thrust end surfaces 34 and 38 can be reduced during the stoppage of the rotational member 28.

The magnetic members 50 and 52 forming the auxiliary thrust bearing 54 may be either electromagnets or permanent magnets, but if a permanent magnet is used as at least one of these magnetic members, the structure thereof will become simple. Of course, permanent magnets may be used as both of these magnetic members or a combination of a permanent magnet and a magnetic member may be used.

Figure 3:
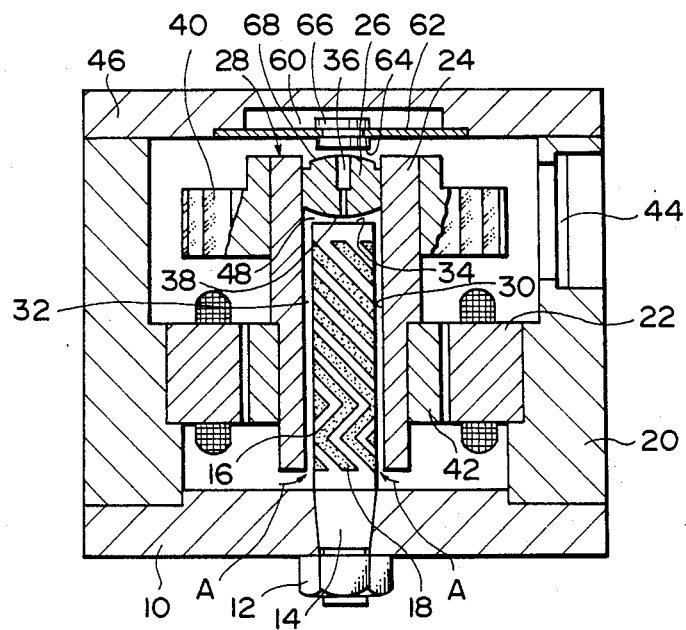

The embodiment shown in FIG. 3 is essentially identical in construction to the first embodiment (see FIG. 1) except that a contrivance is made in the thrust bearing member 26 of the rotational member 28 and the portion above it. That is, a recess 60 is formed centrally of a relatively thick cover 46, a resilient member 62 such as a plate spring is mounted so as to cover the recess 60, and a thrust bearing member 66 having its lower surface formed into a flat thrust end surface 64 is fixed to the central portion of the resilient member 62. The diameter of the upper half of the axial hole 36 of the thrust bearing member 26 is enlarged and also, the upper surface thereof is formed into a thrust end surface comprising a convex spherical surface. The thrust bearing member 66 may be threadedly engaged with a bolt mounted to the cover 46 so that it is vertically movable.

The peculiar operation and effect of the present embodiment will now be described. During the repose and lowspeed rotation of the rotational member 28, the thrust bearing member 66 is urged against the thrust bearing member 26 by the action of the resilient member 62. Therefore, during the transportion of the bearing device, the rotational member is prevented from moving in the thrust direction to create backlash and damaging of the bearing device thereof can be prevented, and further during the low speed rotation pressure release through the bore 36 can be prevented.

Also, during rotation of the rotational member 28, the rotational member 28 floats up due to the pressure in the pressure chamber 48 and the thrust end surface 38 is supported by the thrust bearing film while, at the same time, the thrust bearing member 66 is raised upwardly by the pressure in the axial hole 36 against the action of the resilient member 62 and the thrust end surface 64 is also supported by the thrust bearing film. In this manner, the thrust bearing member 26, namely, the rotational member 28, is supported in its upper and lower surfaces by the bearing film and therefore, even in case extraneous vibration acts on the rotational unit, the vibration of the rotational member 28 provided with a polygon mirror 40 in the axial direction (thrust direction) can be minimized.

A dynamic pressure generating groove which will prevent outflow of the operating fluid may be formed in one of the thrust end surface 64 and the thrust end surface 68.

Figure 4:
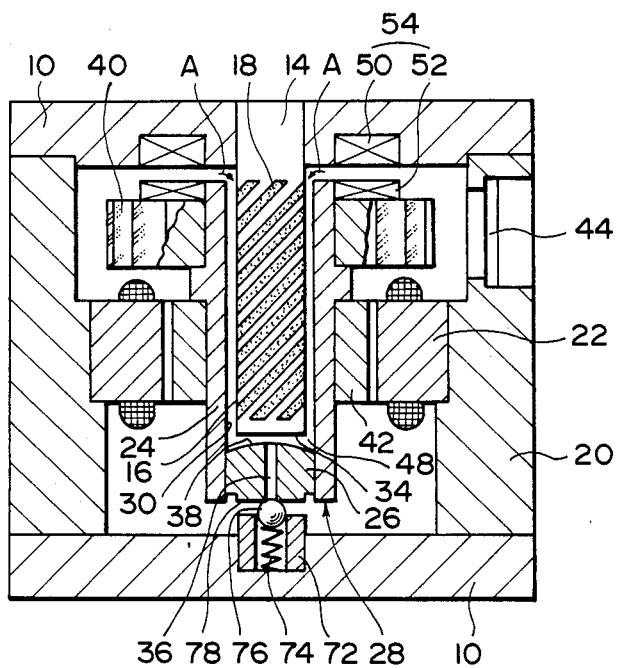

The embodiment shown in FIG. 4 is entirely similar to the second embodiment (see FIG. 21) except that a contrivance is made in the lower portion of the thrust bearing member 26 of the rotational member 28. The contrivance is that a cylindrical member 72 is partly embedded in the base plate 10 in opposed relationship with the thrust bearing member 26, and a coil spring 74 and a steel ball 76 are mounted in the hollow portion of the cylindrical member 72. The coil spring 74 and steel ball 76 are functionally similar to the resilient body 62 and thrust bearing member 66 in the third embodiment (see FIG. 3).

That is, during the repose and low-speed rotation of the rotational member 28, the steel ball 76 pushes up the rotational member 28 with the aid of the biasing force of the coil spring 74 and brings the thrust end surfaces 34 and 38 into contact with each other, while during high-speed rotation of the rotational member 28, the rotational member 28 is forced downward by the pressure of the air in the pressure chamber 48 and the thrust end surface 38 is supported by the thrust bearing film and also, the steel ball 76 is forced upward by the pressure in the axial hole 36 against the action of the spring 74 and thus, the thrust end surface 78 is supported by the thrust bearing film.

We claim:

1. A dynamic pressure assembly comprising as members within a closed housing:

a body;

a solid fixed shaft without a bore therethrough fixed to said body and having a free end;

a rotational member including a sleeve portion surrounding said fixed shaft with a radial clearance and a bottom portion having an internal surface opposed to an end surface of the free end of the fixed shaft, the rotational member being shiftable relative to the fixed shaft;

a pressure chamber formed between the internal surface of said bottom portion and the end surface of said free end;

means for rotating said rotational member, said rotating means including a rotor fixed to said rotational member at an axial position thereof and a stator opposed to the rotor and fixed to said body;

means for generating dynamic pressure in said radial clearance and supplying it to said pressure chamber through said radial clearance, the dynamic pressure generating means being formed between the shaft and the sleeve portion of the rotational member; and pressure regulating means including a restricted flow passage which has an opening in the center of said internal surface to vent a pressurized flow from the pressure chamber, thereby regulating dynamic pressure therein, the rim of said opening defining an annular seat for engagement by a portion of the end surface for closing the opening;

the arrangement being such that said portion of the end surface of said shaft contacts said annular seat of the rotational member and closes the opening and thereby closes the passage when there is no relative rotation between the shaft and the sleeve or when such relative rotation is only at a low speed insufficient to develop in said pressure chamber a sufficiently high hydrodynamic pressure to axially displace the shaft relative to said housing by the hydrodynamic pressure established in said pressure chamber and opens the opening to said pressure chamber and thereby opens the passage when the rotation of the rotational member is at a high speed sufficient to develop a sufficiently high hydrodynamic pressure in said pressure chamber.

2. A dynamic pressure assembly according to claim 1, wherein said dynamic pressure generating means includes grooves formed in an outer peripheral surface of the fixed shaft.

3. A dynamic pressure assembly according to claim 1, further comprising a load member fixed to said rotational member at a position axially distant from said rotor.

4. A dynamic pressure assembly according to claim 3 wherein said load member is a polygon mirror and said housing is provided with a transparent portion through which light rays pass to reach the polygon mirror.

5. A dynamic pressure assembly as in claim 1 and further including preventing means for preventing axial movement of the rotational member when rotation of the rotational member is below a predetermined level.

6. A dynamic pressure assembly according to claim 5, wherein said preventing means allows rotation of the rotational member while preventing the axial movement thereof.

7. A dynamic pressure assembly according to claim 5, wherein said preventing means includes means for magnetically attracting the rotational member toward the housing to fix the rotational member axially.

8. A dynamic pressure assembly according to claim 5, wherein said preventing means includes biasing means for axially fixing the rotational member.

9. A dynamic pressure assembly according to claim 5, wherein said preventing means includes a spring and a ball disposed between the housing and the rotational member.

10. A dynamic pressure assembly according to claim 1, further comprising, a holding means for holding the rotational member relative to said body when no dynamic pressure is generated.

11. A dynamic pressure assembly according to claim 10, wherein said holding means comprises a pair of magnetic members disposed on a portion of the body and opposed portion of the rotational member.

12. A dynamic pressure assembly according to claim 11, wherein said holding means includes a deformable diaphragm fixed to the body to be touched to the rotational member.

13. A dynamic pressure assembly according to claim 11, wherein said holding means includes a ball to be touched to the rotational member and a spring to urge the ball toward the rotational member.

14. A dynamic pressure assembly comprising:
a body;
a solid fixed shaft without a bore therethrough fixed to said body and having a free end;
a rotational member including a sleeve portion surrounding said fixed shaft with a radial clearance and a bottom portion having an internal surface opposed to an end surface of the free end of the fixed shaft, the rotational member being shiftable relative to the fixed shaft;
a pressure chamber being formed between the internal surface of said bottom portion and the end surface of said free end;
means for rotating said rotational member, said rotating means including a rotor fixed to said rotational member at an axial position thereof and a stator opposed to the rotor and fixed to said body;
means for generating dynamic pressure in said radial clearance and supplying it to said pressure chamber through said radial clearance, the dynamic pressure generating means being formed between the shaft and the sleeve portion of the rotational member; and
pressure regulating means including a restricted flow passage which has an opening in the center of said internal surface to vent a pressurized flow from the pressure chamber, thereby regulating dynamic pressure therein, the rim of said opening defining an annular seat for engagement by a portion of the end surface for closing the opening;
the arrangement being such that said portion of the end surface of said shaft contacts said annular seat of the rotational member and closes the opening and thereby closes the passage when there is no relative rotation between the shaft and the sleeve or when such relative rotation is only at a low speed insufficient to develop in said pressure chamber a sufficiently high hydrodynamic pressure to axially displace the shaft relative to said sleeve by the hydrodynamic pressure established in said pressure chamber and opens the opening to said pressure chamber and thereby opens the passage when the rotation of the rotational member is at a high speed sufficient to develop a sufficiently high hydrodynamic pressure in said pressure chamber.

15. A dynamic pressure assembly according to claim 14, further comprising a load member fixed to said rotational member at a position axially distant from a position where said rotor is fixed.

16. A dynamic pressure assembly according to claim 15, wherein said load member includes a polygon mirror.

17. A dynamic pressure assembly comprising as members within a closed housing:
a body;
a solid fixed shaft without a bore therethrough fixed to said body and having a free end;
a rotational member including a sleeve portion surrounding said fixed shaft with a radial clearance and a bottom portion having an internal surface opposed to an end surface of the free end of the fixed shaft, the rotational member being shiftable relative to the fixed shaft;
a pressure chamber formed between the internal surface of said bottom portion and the end surface of said free end;
means for rotating said rotational member, said rotating means including a rotor fixed to said rotational member at an axial position thereof and a stator opposed to the rotor and fixed to said body;
a load member secured to said rotational member at a second axial position axially distant from said first position;
means for generating dynamic pressure in said radial clearance and supplying it to said pressure chamber through said radial clearance, the dynamic pressure generating means being formed between the shaft and the sleeve portion of the rotational member; and
pressure regulating means including a restricted flow passage which has an opening in the center of said internal surface to vent a pressurized flow from the pressure chamber, therby regulating dynamic pressure therein, the rim of said opening defining an annular seat for engagement by a portion of the end surface for closing the opening;
the arrangement being such that said portion of the end surface of said shaft contacts said annular seat of the rotational member and closes the opening and thereby closes the passage when there is no relative rotation between the shaft and the sleeve or when such relative rotation is only at a low speed insufficient to develop in said pressure chamber a sufficiently high hydrodynamic pressure to axially displace the shaft relative to said sleeve by the hydrodynamic pressure established in said pressure chamber and opens the opening to said pressure chamber and thereby opens the passage when the rotation of the rotational member is at a high speed sufficient to develop a sufficiently high hydrodynamic pressure in said pressure chamber.

18. A dynamic pressure assembly according to claim 17, wherein said load member includes a polygon mirror.

19. A dynamic pressure assembly according to claim 18, wherein said closed housing is provided with a transparent member through which light rays from the exterior are transmitted to reach said polygon mirror.

20. A dynamic pressure assembly according to claim 19, wherein said transparent member is made of a glass.

* * * * *